Jan. 15, 1952 F. L. WASSELL 2,582,729

COMBINED ADDRESS AND FILE CARD

Filed March 27, 1946 2 SHEETS—SHEET 1

INVENTOR.
FRANK LLOYD WASSELL
BY
Hoguet, Neary & Campbell
ATTORNEY

INVENTOR.
FRANK LLOYD WASSELL
BY
Hoguet Neary & Campbell
ATTORNEY

Patented Jan. 15, 1952 2,582,729

UNITED STATES PATENT OFFICE 2,582,729

COMBINED ADDRESS AND FILE CARD

Frank Lloyd Wassell, Westport, Conn., assignor to Georgene Parkin Wassell, Westport, Conn.

Application March 27, 1946, Serial No. 657,505

1 Claim. (Cl. 101—149.4)

This invention relates to card filing systems, and has particular reference to improvements in loose-leaf card filing systems wherein the cards are echeloned laterally to expose a desired portion of each card to view.

Various card indicia, selective characters, tabs and the like have been employed heretofore to facilitate selection and placement of the individual card in filing systems. It is difficult to maintain the filed cards in the desired relationship. Lateral displacement of the cards frequently occurs during manipulation of the card system with resultant masking of visual indicia and confusion as to location. Withdrawal of a card from the file tends to tilt or otherwise displace adjacent cards, necessitating frequent rearrangement of the entire filing system. This is particularly the case when the cards curl or become soiled, as may result from frequent handling.

It is an object of the present invention to provide an improved loose-leaf card filing system which is easily and cheaply constructed and wherein the cards are accurately and relatively firmly positioned in a desired relationship.

A further object is to provide a card filing system wherein the cards are placed in laterally echeloned relationship, rendering visible preselected marginal portions of each card.

A further object is to provide a card filing system wherein the individual cards are stabilized against tilting or rocking movement upon withdrawal of an adjacent card, thus minimizing disarrangement of the card file system during use.

A further object of the invention is to provide a card for use in a card filing system wherein novel means are provided to facilitate registry and subsequent use of information imprinted on the card.

Yet a further object is to provide a card filing system wherein visual indicia on the cards indicate a condition or the state of completion of the file contents.

Other objects and advantages of the invention will be apparent from the following description and drawings, wherein Figure 1 is a view in vertical elevation of the card filing system of the invention with the front panel of the card filing cabinet removed to show the relative positioning of the cards therein;

Figures 1, 2, 3:
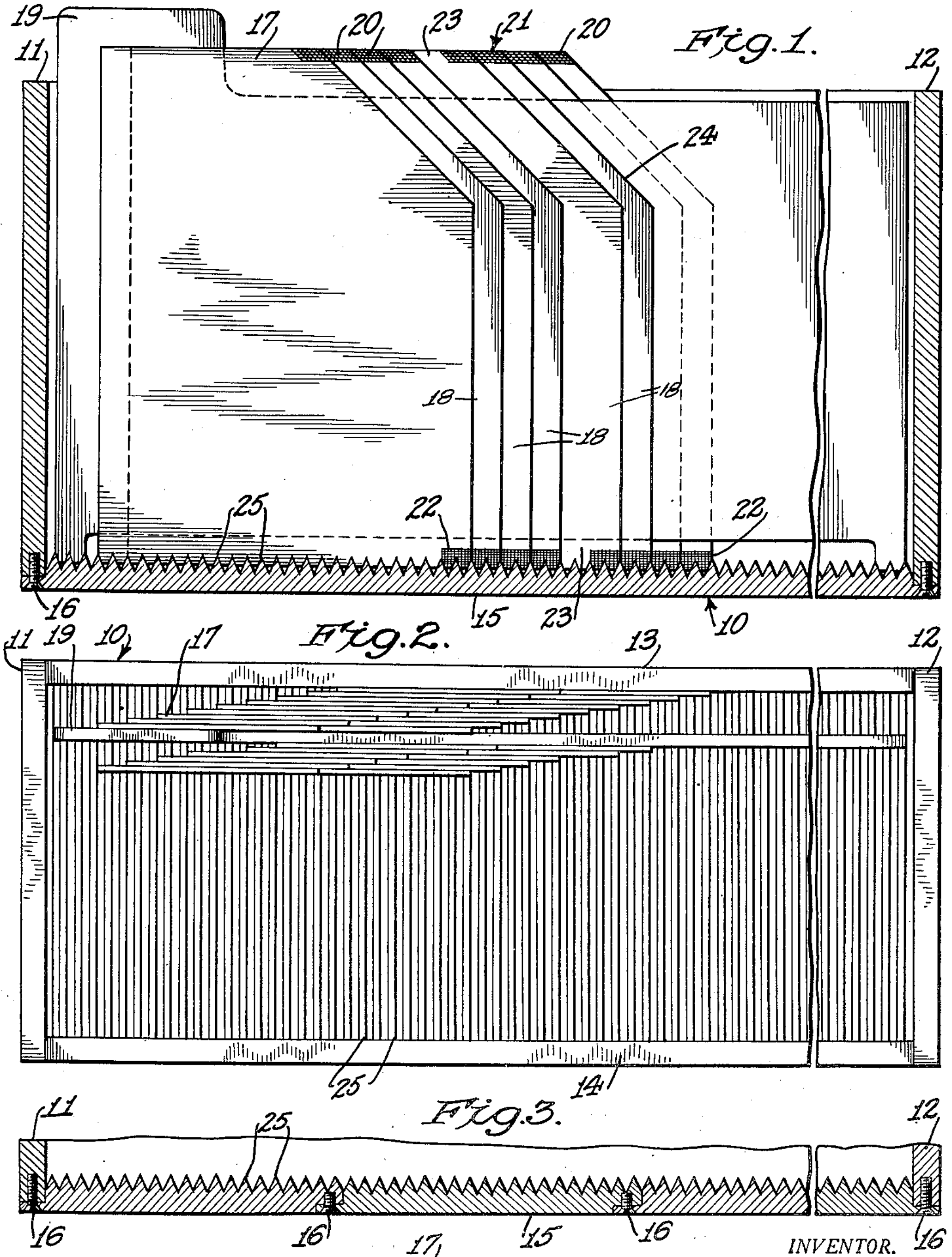
Figure 2 is a top plan view thereof.
Figure 3 is a detailed cross sectional view of the tray of the filing cabinet showing the novel card supporting means employed.

Referring to the drawings, the numeral 10 refers to a card filing cabinet having side walls 11 and 12; rear wall 13; front 14; and a bottom tray 15, assembled in conventional manner by screws 16. As shown in Figure 1, a number of cards 17 are assembled in laterally echeloned relationship, each card being spaced to expose a marginal portion 18 of the next adjacent card. A master card 19 may be provided to subdivide the cards 17 into any number of desired groupings within the filing cabinet.

Figure 4:
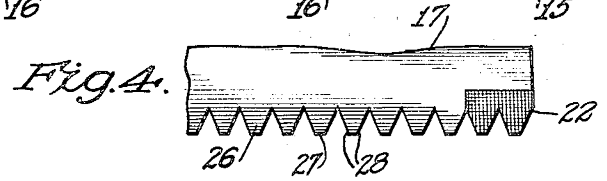
Figure 4 is a detailed view of the bottom edge of a card employed in the present invention.

The cards 17 may be provided with visual or other selective characters to facilitate grouping and indexing. As shown in Figures 1 and 4, the upper edge of each card 17 is provided with a mark 20, adapted to form a continuous line 21 of a series of marks, when a number of cards 17 are positioned in the filing cabinet. The bottom edge of the card 17 may be similarly marked at 22. It will be apparent that displacement of or removal of a card 17 from the file will leave a break in the continuity of the line 21 as at 23, instantly indicating to the operator the absence of a card from the file or the proper position of a card which has been removed from the file for examination.

The upper edges of the cards 17 may be formed with a sloping portion 24, providing a convenient space for tabulating data such as a name, an address, an indicating key or number, or the like.

As shown in Figures 1 and 3, means are provided for selectively positioning and stabilizing the cards in the filing cabinet, reducing to a minimum disarrangement of the file upon removal of a card. To achieve this object of the invention the bottom portion of the cabinet or tray 15 is formed with a series of grooves and ridges or guides 25, forming a corrugated or saw-tooth surface which receives complementally deformed portions of the cards 17. As shown in Figure 4, the bottom portion of the card 17 may be provided with a corrugated or saw-tooth edge comprising a series of ridges 26 having blunted or truncated extremities 27 forming angular edges 28, adapted to be received between the corresponding guides 25 of the tray 15. The cooperating saw-tooth surfaces of the cards and the filing tray 15 facilitates seating of the cards in the tray in proper position, and position the cards firmly against accidental lateral movement. Similarly, upon removal of a card, the tendency of adjacent cards to tilt or otherwise displace is resisted by frictional engagement of the angular edge 28 of the card 17, with the corresponding adjacent surfaces of the tray guides 25. This construction provides an unusually firm surface contact between the card edges and the receiving tray of the filing cabinet, and avoids the necessity for providing auxiliary card positioning means such as cross rods and the like, which only loosely engage the bottom of the card, offering no resistance to tilting of the cards. By truncating the ridges 26 of the card 17, inaccuracies of placement of the cards due to bending or fraying of the ridges on the card edge, are avoided. Moreover, by formation of the teeth 26 in the manner shown to impart added strength at the bases thereof, a greater number can be formed per inch and thus lateral displacement of the cards can be provided in stages as small as the type of a typewriter.

It will be observed that in forming the filing system, the cards may be displaced laterally by the operator to the extent of any desired multiple of the guides 25, so that a predetermined marginal portion of the card 17 will be exposed to view. In the embodiment of the invention shown, the indicia 20 and 21 are proportioned to a lateral displacement of two of the guides 25 in the tray 15. It is apparent that this system may be modified as desired by the operator merely by extending proportionally the indicia 20 and 21 along the respective edges of the card 17.

The tray 15 may be constructed of wood, plastic or metal, being easily and inexpensively formed to provide the desired corrugated or saw-tooth surface, without the necessity of fitting auxiliary parts to the cabinet.

Figure 5:
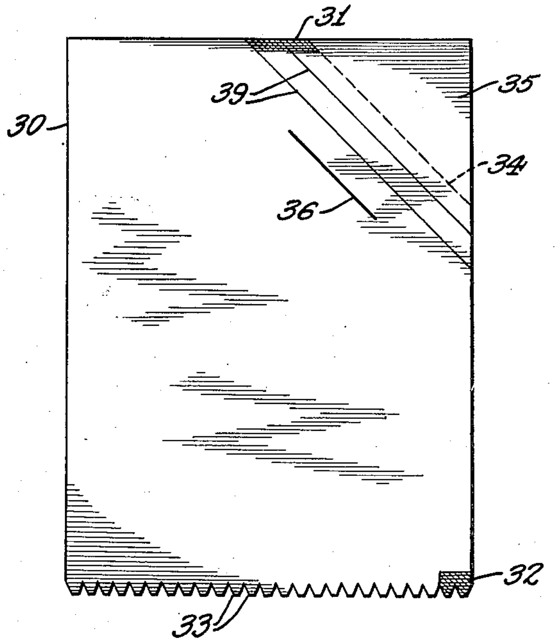
Figure 5 is a face view of a further embodiment of filing card for use with the present invention.
Figure 6:
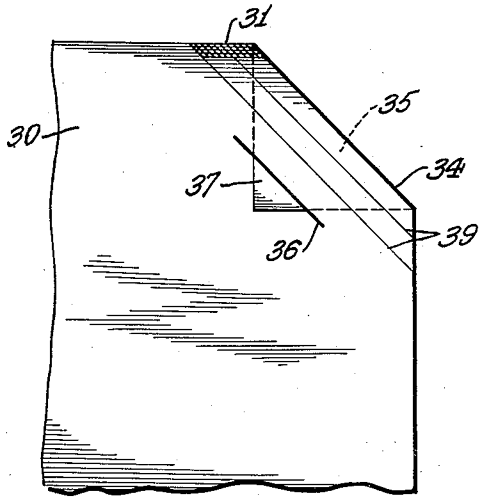
Figure 6 is a fragmentary view of the card with the edge thereof in operative position.
Figure 7:
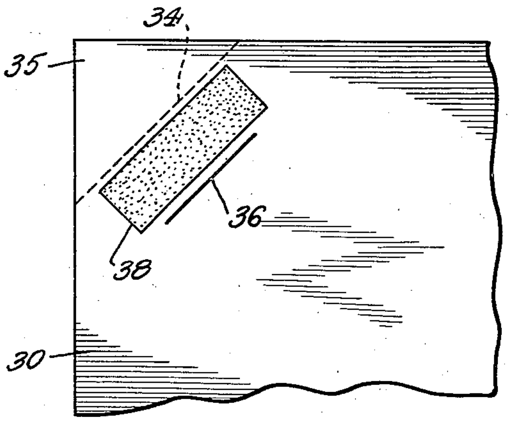
Figure 7 is a view of the reverse side of the card.

In a further embodiment of the invention, there is provided a filing card 30 preformed to facilitate the recording of data and employing the data in addressing bills, notices and the like. As shown in Figures 5–7, the card 30 preferably may be formed with marginal characters 31 and 32 to facilitate grouping of the cards in echelon in a card index file, not shown. The bottom edge of the card 30 may be corrugated as at 33, for the purposes and advantages previously described.

The corner of the card 30 is folded back at 34 forming a flap 35, and the card is slotted at 36 to receive the point 37 of the flap 35, firmly positioning the flap against the card. As is shown in Figure 7, a print reproducing material such as carbon paper 38 is suitably affixed to the reverse side of the card beneath the flap 35. In this manner, when data such as an address is typed onto the card 30 as at 39, the data is reproduced either on the flap 35 or the reverse side of the card 30, as may be desired. The carbon impression of the data may be employed advantageously with carbon impression reproducing mechanisms now available, to address bills, notices and the like, facilitating operation of the card filing system for this purpose.

While the invention has been described with reference to the drawings, it is intended to be limited only as defined in the following claim.

I claim:

A card for use in a filing system, said card comprising a main body portion, a flap at one corner of the main body portion, and a print reproducing material, the main body portion having an obverse side, a reverse side and a slot, the flap being connected to the main body portion by a fold line and being folded against the reverse side of the main body portion, the slot being spaced from the fold line for releasably retaining the end of the folded flap, and the print reproducing material being sandwiched between the folded flap and the reverse side of the main body portion covered by the folded flap, the main body portion further having an indicia receiving area on the obverse side between the fold line and the slot, said indicia receiving area being of a size and shape to receive an address or index mark and said print reproducing material being opposite and co-extensive with the indicia receiving area to make a reproducible impression of the address or index mark on the reverse side covered by the flap.

FRANK LLOYD WASSELL.

REFERENCES CITED

The following references are of record in the file of this patent:

UNITED STATES PATENTS

| Number | Name | Date |
|---|---|---|
| 961,928 | Wooldridge | June 21, 1910 |
| 1,000,501 | Elliott | Aug. 15, 1911 |
| 1,122,874 | Donovan | Dec. 29, 1914 |
| 1,170,434 | Engel | Feb. 1, 1916 |
| 1,208,269 | Belknap | Dec. 12, 1916 |
| 1,250,568 | Dayton | Dec. 18, 1917 |
| 1,367,550 | Jones | Feb. 8, 1921 |
| 1,939,089 | Tanschek | Dec. 12, 1933 |
| 1,945,927 | Watson | Feb. 6, 1934 |
| 2,209,586 | Swift | July 30, 1940 |
| 2,336,572 | Schuessler | Dec. 14, 1943 |
| 2,381,170 | Kendig | Aug. 7, 1945 |
| 2,398,982 | Watkins | Apr. 23, 1946 |